(12) United States Patent
Mermet et al.

(10) Patent No.: US 8,319,634 B2
(45) Date of Patent: Nov. 27, 2012

(54) METHOD AND SYSTEM FOR THE TRACKING OF ARTICLES

(75) Inventors: Jean-Francois Mermet, Tourrettes-sur-Loup (FR); Bernard Pucci, Cagnes-sur-Mer (FR); Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 12/113,292

(22) Filed: May 1, 2008

(65) Prior Publication Data

US 2008/0281618 A1 Nov. 13, 2008

(30) Foreign Application Priority Data

May 9, 2007 (EP) .................................... 07107843

(51) Int. Cl.
*G08B 1/08* (2006.01)

(52) U.S. Cl. ............... 340/539.13; 340/572.1; 340/10.1; 340/10.3; 340/539.23; 340/539.1

(58) Field of Classification Search .... 340/572.1–572.9, 340/539.13, 425.5, 10.33, 10.1, 539.1, 539.23, 340/10.3; 235/375, 385, 376
See application file for complete search history.

(56) References Cited

U.S. PATENT DOCUMENTS

| | | | |
|---|---|---|---|
| 6,882,274 B2 | 4/2005 | Richardson et al. | |
| 2002/0177476 A1 | 11/2002 | Chou | |
| 2004/0119605 A1 | 6/2004 | Schaper | |
| 2004/0233041 A1* | 11/2004 | Bohman et al. | 340/10.1 |
| 2005/0052281 A1 | 3/2005 | Bann | |
| 2005/0231366 A1* | 10/2005 | McHugh et al. | 340/568.2 |
| 2006/0055507 A1* | 3/2006 | Minowa | 340/5.1 |
| 2006/0208857 A1* | 9/2006 | Wong | 340/5.82 |
| 2006/0232405 A1* | 10/2006 | Filibeck | 340/572.1 |
| 2006/0250234 A1* | 11/2006 | Maschke | 340/539.13 |
| 2007/0013481 A1 | 1/2007 | Zhu et al. | |
| 2007/0203768 A1* | 8/2007 | Adra | 705/7 |
| 2007/0222595 A1* | 9/2007 | Motteram et al. | 340/572.1 |
| 2008/0079577 A1* | 4/2008 | Malik | 340/572.1 |
| 2008/0154415 A1* | 6/2008 | Salour et al. | 700/108 |
| 2008/0180246 A1* | 7/2008 | Malik | 340/572.1 |
| 2008/0186143 A1* | 8/2008 | George et al. | 340/10.3 |

OTHER PUBLICATIONS

Giulio, "Autonomic Deadlock Prevention in Self-Managing Databases", IBM Software Group—Rome Tivoli Laboratory, 7 pages.

* cited by examiner

*Primary Examiner* — Hoi Lau
(74) *Attorney, Agent, or Firm* — Andrea Bauer; Hoffman Warnick LLC

(57) ABSTRACT

Detecting whether an article has been loaded or unloaded for example from a ship by tracking the movements of a transducer such as an RFID tag attached to the article in space, and comparing the tracked movements with a trajectory envelope characterizing the movements associated with a load or unload action, and in the case where the movements of the article are found to comply with the trajectory envelope, registering the article as present in the predetermined volume.

19 Claims, 11 Drawing Sheets

METHOD AND SYSTEM FOR THE TRACKING OF ARTICLES

FIELD OF THE INVENTION

The present invention relates to the tracking of articles.

BACKGROUND OF THE INVENTION

As trade lanes lengthen and grow in complexity with the spread of globalization and the continuous emergence of new goods, components and markets, it is increasingly important to track and record the position of such articles with an ever higher level of detail in both time and space.

The IBM® Secure Trade Lane is a global logistics information platform. It gives global supply chain stakeholders access to information on demand, allowing real-time access and response to physical cargo monitoring data as well as the related logistics transaction data. For the first time, shipments can be monitored from the manufacturer to the store, so related activities such as port operations can be optimized.

Shipping plays a key role in the global economy. Without shipping, intercontinental trade, the transport of raw materials, manufactured goods, and food would simply not be possible. The international shipping industry is responsible for the carriage of 90% of world trade. Every year, 50,000 merchant ships transport more than 6 billion tons of goods in some 20 million maritime containers.

In this age of just-in-time manufacturing and supply, containers are virtual warehouses that move goods from their origin to destination via an intricate set of processes that often involve more than ten different service providers, government representatives, or intermediaries. Market and customer pressures demand that the complex operations of these virtual warehouses be optimized and this has implications for both the public and private parties in the trade lane.

Governments are pressured to improve clearance speed and to reduce the cost and burden on trade to support global, integrated, just-in-time supply chain requirements. Moreover, security must be drastically improved in these times of increased terrorist threats and security breaches—currently only a mere 2-4% of the transported containers are physically inspected. These needs are driving changes in public policy that will have effects throughout the industry.

Compliance with new public laws and regulations as well as the demand from customers for greater performance in the supply chain—shorter global delivery times, reduced costs, and improved operational efficiencies—will confront all the public and private parties in the trade lane with new challenges in terms of security, reliability, liability, visibility, and efficiency of container shipments.

The IBM Secure Trade Lane is a comprehensive new global logistics information platform that addresses all the challenges mentioned above by providing unprecedented levels of supply chain efficiency and security. It gives global supply chain stakeholders access to information on demand, allowing real-time access and response to physical cargo monitoring data as well as the related logistics transaction data such as order information, invoices, financial data, bills of lading, manifests, etc.

The IBM Secure Trade Lane architecture may use an intelligent wireless monitoring device which is mounted on each container. Information provided by the wireless monitoring device is made available to the supply chain participants through a Shipment Information System. The latter coordinates the sharing of information among authorized parties using proved information technology techniques and tools.

The wireless monitoring device has two primary functions: (1) to create an audit trail of container movements and events from its point of origin to its destination; and (2) to make this information available to authorized entities, allowing them to perform risk analysis, to assess the container's security and integrity, and to optimize the efficiency of container shipments. The wireless monitoring device automatically collects information on container events, including physical location based on GPS, state of the container such as temperature, humidity, ambient light, acceleration, and door status. It can communicate with the backend over satellite communication, a cellular system (GSM/GPRS), or a Wireless Personal Area Network (WPAN) based on ZigBee/IEEE 802.15.4 radio. A handheld device can also be used to communicate with the wireless monitoring device over a WPAN. The wireless monitoring device incorporates significant processing power, which enables it to analyze events and take appropriate actions. For example, opening of the door within a predefined geographic zone by an authorized person is an event that is logged; but opening of the door outside of the predefined zone or by an unauthorized person will trigger the sending of an alert to the backend server monitoring the status of the containers.

The wireless monitoring devices are connected wirelessly to a Logistics Service Provider (LSP) through a secure, fully integrated network that links to the SIS—an SOA-based (service-oriented architecture-based) distributed network enabling end-to-end data collection and reporting. Together they enable manufacturers, customers and any authorized member of the logistics network to view cargo integrity and location. Each participant owns and manages its own data through decentralized databases, ensuring full customer control over data access and privacy.

The IBM Secure Trade Lane solution offers services such as shipment monitoring services which enable end-to-end, real-time monitoring and visibility of any container, anywhere in the world. Data collected can be used to offer value-added services to other trading partners who seek to better manage on-time deliveries, to identify bottlenecks quickly, to take advantage of green-lane customs treatment and to realize additional supply chain efficiencies. Shipment information sharing services meanwhile allow trading parties within and across industries to exchange data more easily, helping them to better meet their security and efficiency objectives.

The tracking of articles for example in contexts such as described above can be particularly problematic at a point where the article changes status, for example when it is transferred between two vehicles, or when it is transferred from storage to a vehicle for transport. It is at such moments that a particularly high degree of tracking detail is desirable.

FIG. 1 shows a typical environment in which the status of an article may change. Specifically, FIG. 1 shows a quay 130 from which a container 150 is loaded onto the deck of a cargo vessel 100 by means of a crane 121. Other containers 101 are already disposed on the deck of the cargo vessel. The quay side is a first elevation above the level of the water 140 on which the cargo vessel 100 floats.

The list of containers loaded or unloaded between the loading quay and a vessel is not automatically created by an electronic system, and errors can appear. The error can be found a long time after the port operations. This has major inconveniences such as entailing a break in the supply chain operations. Furthermore, power management of a tracking device may not be performed on ocean routes: It is desirable to deactivate an electronic tracking devices (tracking device) mounted on commercial containers. The main challenge for those devices is the power/energy management due to lack of external power supply. The major contributor to energy consumption is due to the GPS detection and communications over the air. When on board of a vessel, the tracking device is not able to detect GPS or communicate and thus those functions must be turned off to save energy and turn on back when the container is unloaded from the vessel.

Certain prior art documents relate to this field. U.S. Pat. No. 6,281,797 and U.S. Pat. No. 6,734,796 relate to a tracking device that is associated with a cargo container. The cargo container is used for shipping of goods and materials and is placed into transportation vessels for shipment. The tracking device includes a GPS for receiving positioning information concerning the location of the cargo container and is adapted to transmit the location of the cargo container remotely. Sensor(s) are also operatively associated with the cargo container and tracking device to sense information concerning the surroundings of the cargo container. The tracking device receives this sensor information and deactivates the tracking device when the cargo container is either inside or in proximity to the aircraft. GPS and COMM are switched off by detection of a basic information received from a sensor, which may be sensitive to frequency, vibration, image, movement, reactivation by timer or GPS.

The "tracking device" shouldn't switch on sleep mode before the loading operation. These patents describe a way to switch off GPS and communications functions when the container is in the vicinity of a plane (to avoid electronic devices perturbations).

US 2007/0013481, entitled "Method and apparatus for battery power conservation in tags", discloses a method and system for battery power conservation in tags. Shipping containers are tracked by affixing RFID tags, wherein the tags communicate with remote tracking device for location identification. Further, each battery has two operating modes, a first operating mode and a second operating mode wherein, the first operating mode consumes lesser power when compared to the second operating mode. The first and second operating modes correspond to the first range and second range of distances from the remote tracking device in increasing order respectively. Upon detecting an event of movement of the shipping container, the remote tracking device timestamps the event, stores the current location and accordingly sends a signal to indicate operation in the first operating mode if the current location falls under the first range of distance. Further, the tracking device periodically receives and sends tracking signals to the tag to compute the velocity of the container and multiplies it with time of travel at periodic intervals to determine the range of displacement of the shipping container from the remote tracking device. Upon detecting that the shipping container has moved from first range of distance to the second range of distance, the tracking device sends a signal instructing the tag to switch to second operating mode if needed. Also, the system can adaptively switch the tag from second operating mode to the first operating mode upon moving closer to the remote tracking device.

US 2002/0177476, entitled "Durable global asset-tracking device and a method of using the same", discloses a method and system power efficient global asset tracking device. The tracking system comprises a processor module to which a location module, a communication module, a power module and plurality of distinct antenna are coupled with. The power module has two modes: active mode and a sleep mode. The plurality of distinct antennas is configured to receive GPS communication, or RF communication. In the event of the availability of the GPS satellite communication, the tracking system communicates with the GPS in order for the position to be tracked accurately by the location module. The location module further comprises a memory for storing the last known position. However, in the event of failure/unavailability of GPS communication, the communication module may communicate with available RF transceivers. In such an event, a sensor coupled to the location module may detect the motion of the asset being tracked in all the three dimensions and accordingly updates the memory in the location module about the current position. Further, upon reestablishing communication with GPS, the current exact location may be communicated to the tracker. In addition, power module may adaptively switch the tracking system to the sleep mode if the sensor doesn't detect any motion by the asset for a predetermined time.

U.S. Pat. No. 6,882,274, entitled "Energy conserving satellite tracking tag", discloses a method and system for energy conserving satellite tracking tag used for ship movement tracking. The system comprises an RFID tag attached to shipping container which further has a power conditioner engaged to it. The power conditioner determines if the tag is powered by external power supply being derived from communication from any tracking system and continuously transmits its RFID tag information, collects location data from GPS and produces an output signal representative of its location for transmission to the tracking system. Also, the system selectively operates the tag in a battery mode, when the tag doesn't detect any communication from tracking system.

US 2005/0052281, entitled "Systems and methods for tracking the location of items within a controlled area" discloses a method and system for location tracking of a moving vehicle in a controlled area. The system comprises two or more RFID interrogators fitted to the moving vehicle, plurality of RFID tags fitted in the controlled area in forms of horizontal and vertical arrays, weight sensitive sensors, and a location authority configured to track the location of the moving vehicle. Further, the moving vehicle may contain item/articles for delivery. The RFID interrogators acquire RFID information from the nearest RFIDs located in the close proximity to the moving vehicle and transmit the location information data to the location authority. Further, the location authority computes the current location of the moving vehicle by referring to the ID of the tags and their corresponding predetermined coordinates. Thereafter, two or more consecutive location information data sent by the moving vehicle may be used by the location authority to determine the currently followed direction by the moving vehicle. Further, the location authority may store timestamps for each received location information data so as to compute the velocity of the moving vehicle. Also, the weight sensitive sensors may determine events like unloading/loading of items in the vehicle and communicate the same to the location authority for logging.

SUMMARY OF THE INVENTION

The present invention determines whether an article is present in a predetermined volume at a particular time. This approach enables unambiguous detection of certain movement operations such as load or unload operations.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements.

DETAILED DESCRIPTION OF THE INVENTION

According to the present invention there is provided a method of determining whether an article such as a shipping container, crate, drum, parcel or any other movable object is present in a predetermined volume, which may correspond for example to a cargo area of a vehicle, such as a ship or lorry, a warehouse or any other volume to which an article may be moved. Using a real time location function, a specific algorithm has been developed, that is able to identify with certainty a loading/unloading operation by observing the article trajectory relatively to the vessel position, by detecting a combination of a vertical movement together with a horizontal movement from one place to another. A trajectory envelope is defined, and the position of the article is determined at each of a plurality of successive instants preceding the particular time. It is determined whether each of these successive positions thus determined lies within the trajectory envelope, and in a case where all of the positions are determined to lie within the trajectory envelope, the article is registered as present in the predetermined volume. The position of the article may be determined at each of the plurality of successive instants by measuring the differences between respective transit times of signals, such as radio signals, between each of a plurality of physically separated points at known locations, ideally relative the predetermined volume. In accordance with certain location techniques, the signals, transmitted from the article and received at the points, may carry the identification of the article (ID), and/or may comprise time information.

In particular, in embodiments based on localization by means of an active RFID tag at the transducer, the message may contain an identifier of the article, the transducer, or the tag. The message containing this information is emitted by the tag. In particular, Ultra Wide Band tags are not generally capable of duplex communication. Embodiments may be envisaged where location calculations and possibly the trajectory envelope comparison, are carried out within the transducer, the results of which calculations may then be transmitted.

The trajectory envelope may be derived as a function of the movements consistent with a deliberate mechanical movement of the article from a starting position in the predetermined volume, and as such will not generally describe a classic ballistic trajectory. The volume preferably lies outside the trajectory envelope.

Figure 1:
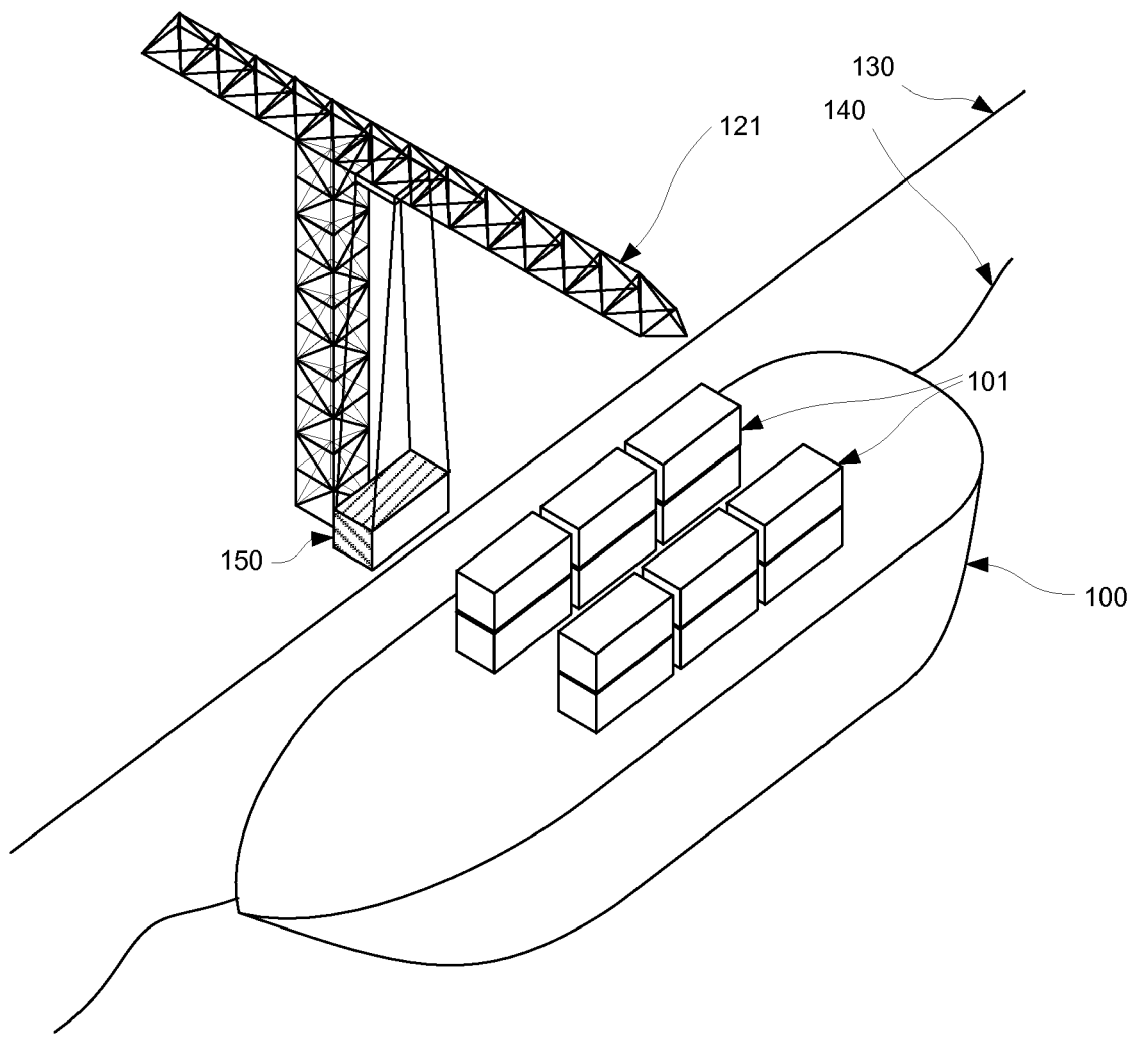
FIG. 1 shows a typical environment in which the status of an article may change.

By determining whether the article lies in the volume or not on the basis of the history of the article's movements, it is no longer necessary to explicitly detect the article within the area itself. This is highly advantageous since the volumes in question to which articles may be moved such as cargo holds, etc., are likely to be crowded with other articles making detection or stocktaking difficult. Furthermore, such other articles are likely to be similar to the article in question, in terms of distinguishing features such as size, weight, appearance etc. Still further such other articles in many cases will be at least partially of steel or other metal construction likely to interfere with detection signals. For example in the case of the situation shown in FIG. 1, the further containers 101 are likely to shield and thereby make undetectable any new container added to the cargo of the vessel.

FIG. 2 shows a series of stages constituting a first embodiment of the invention. Each of these stages comprises the same elements as described above with respect to FIG. 1, along with certain further elements as described hereafter. FIG. 2a shows a first stage of the first embodiment of the invention. As shown in FIG. 2a, the container 150 is provided with a transducer 251. The cargo vessel 100 meanwhile is provided with a set of location devices 221, 222, 223, 224, 225 and 226 at physically separated points at known locations, which exchange signals with the transducer 251 so that the position thereof may be determined. The transducer 251 may comprise an active RFID tag attached, emitting regularly its ID, and it may be this signal which is detected by the location devices. In particular this exchange of signals may include for example a propagating signal such as radio, optical, sonic or other signals, which may include timing, identification or other such information, or may simply constitute signals identifiable by particular characteristics such as duration, frequency, etc. Such signals may be transmitted from the transducer 251 to the, or from the location devices to the transducers, bidirectionally. The skilled person will appreciate that there are many variations on the basis of such factors which will enable the location in space of the transducer with respect to the location devices. The type of systems known as "Ultra Wide Band" systems may be particularly appropriate. In order to locate the transducer in two dimensions it is necessary that the transducer be in communication with a minimum of two location devices. In order to locate the transducer in three dimensions it is necessary that the transducer be in communication with a minimum of three location devices.

Figure 2A:
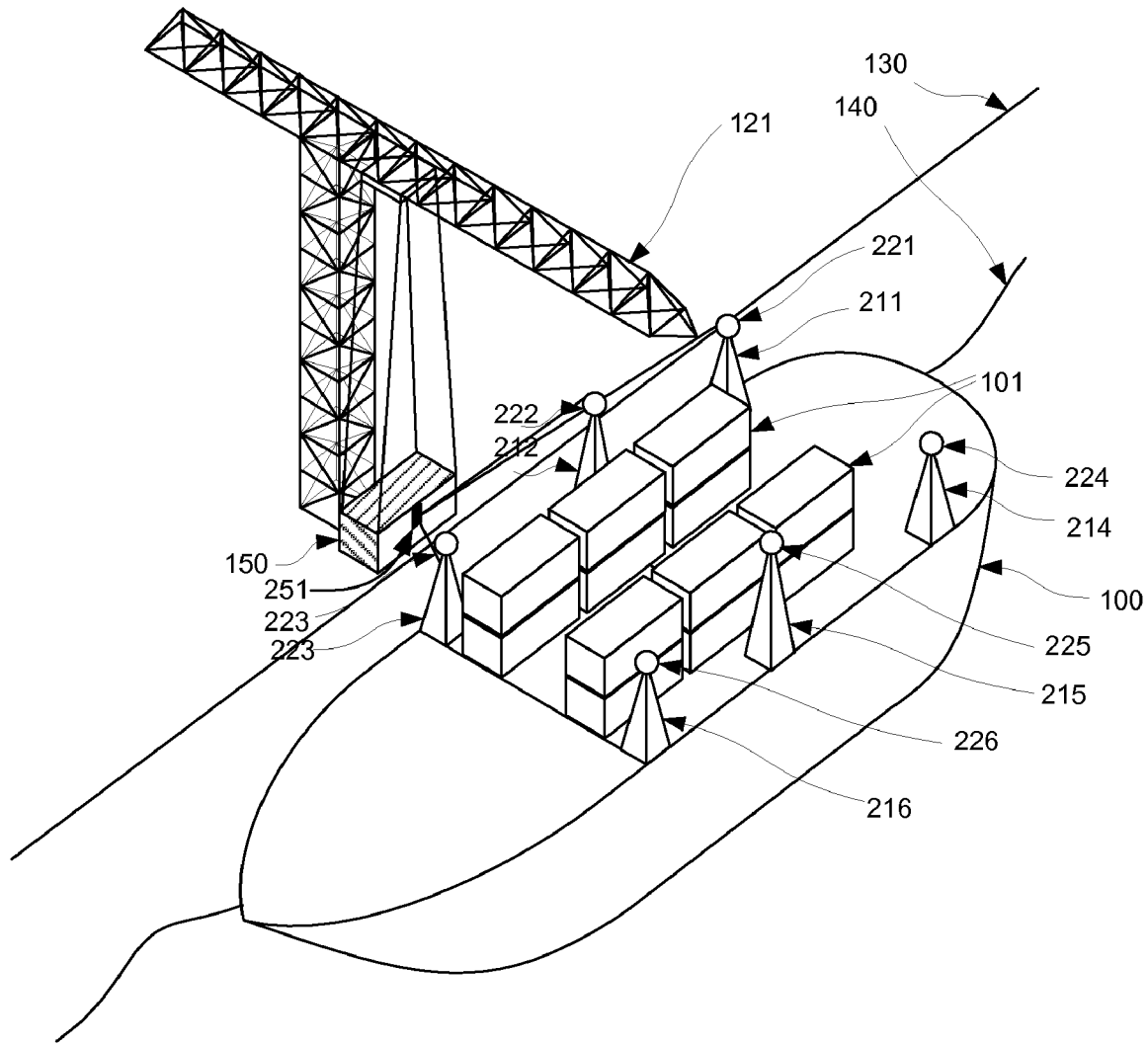
FIG. 2a shows a first stage of a first embodiment of the invention.

As shown in FIG. 2a the vessel 100 is provided with six location devices, with three devices 221, 222, 223 disposed on the starboard side and three devices 224, 225, 226 disposed on the starboard side, with the starboard side being closest to the quayside. Each of the location devices is mounted on a respective pillar 211, 212, 213, 214, 215, elevating the location devices above the deck of the vessel. In order to locate the transducer in three dimensions in an unambiguous manner it is necessary that the three location devices with which the transducer is in communication should not be disposed upon the same straight line. Accordingly as shown in FIG. 2a the central pillars 212, 215 are taller than the outer pillars, so that the corresponding central location devices 222, 225 are situated at a higher elevation than the peripheral location devices 221, 223, 226, 224, so that the location devices on each side are not situated on the same line. Naturally many other configurations can be envisaged on the basis of Euclidian geometry providing the same compliance with the requirements of locating the position of the transducer with respect to the location devices. Since the location devices are in a fixed physical relationship with respect to the vessel 100, the determination of the transducer's position with respect to the location devices is equivalent to determining the transducer's position with respect to the vessel. Naturally other locations for the location devices may be envisaged, for example fixed with respect to the quay. Thus as shown the three location devices 221, 222 and 223 have a clear view of the quay, and in particular the container 150, and the transducer affined thereto. The angle of view extents upward and backwards, only being obscured by the other containers 101 already situated on the deck of the vessel 100.

The starting position of the container 150 is determined in communication with the location devices and recorded.

Figure 2B:
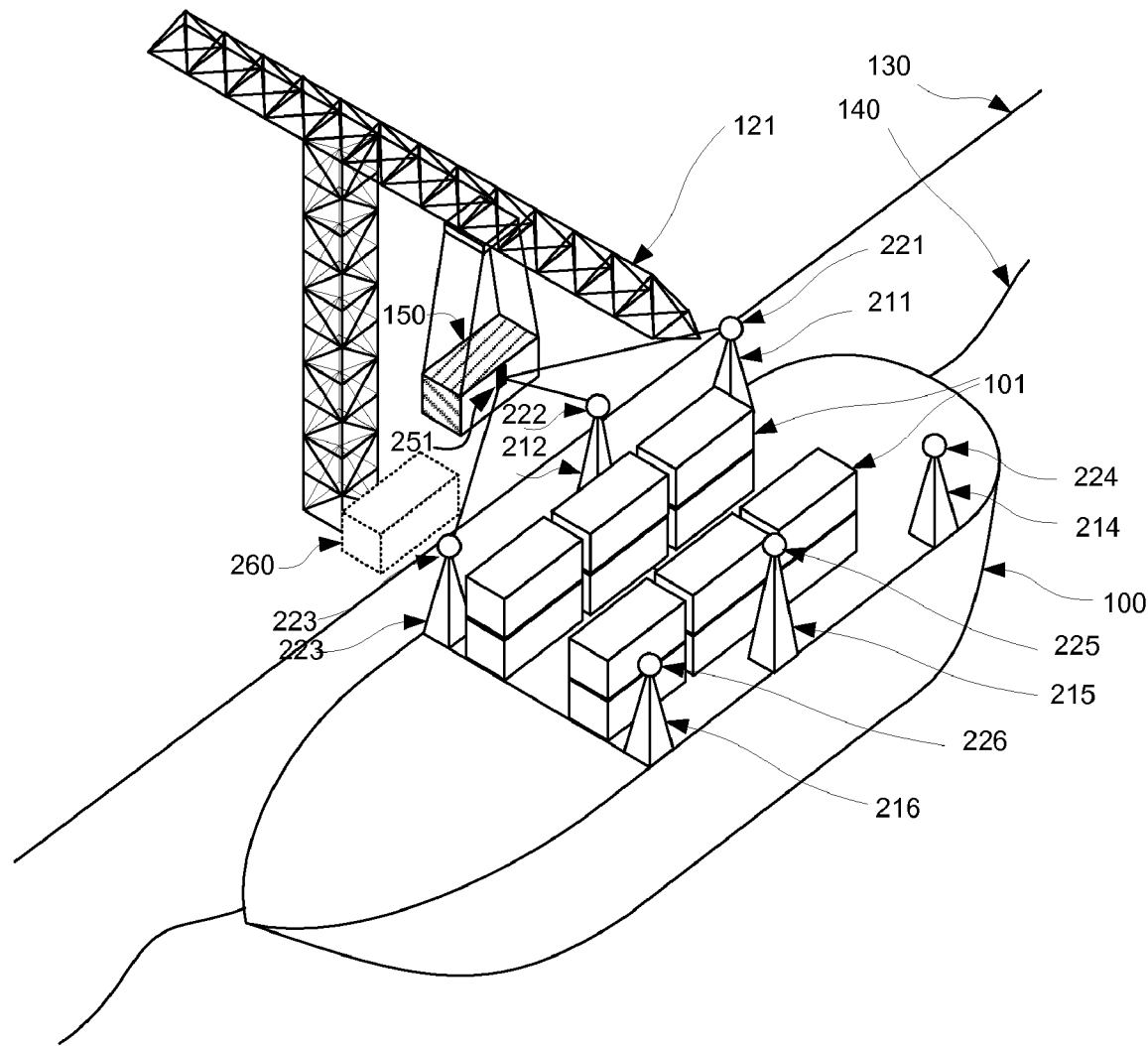
FIG. 2b shows a second stage of the first embodiment of the invention.

FIG. 2b shows a second stage of the first embodiment of the invention. As shown here the container 150 has been lifted by the crane 121 and moved towards the vessel 100. The shape of a container drawn with a broken line 260 shows the starting position of the container 150 of FIG. 2a. The new position of the container 150 is determined in communication with the location devices and recorded.

Figure 2C:
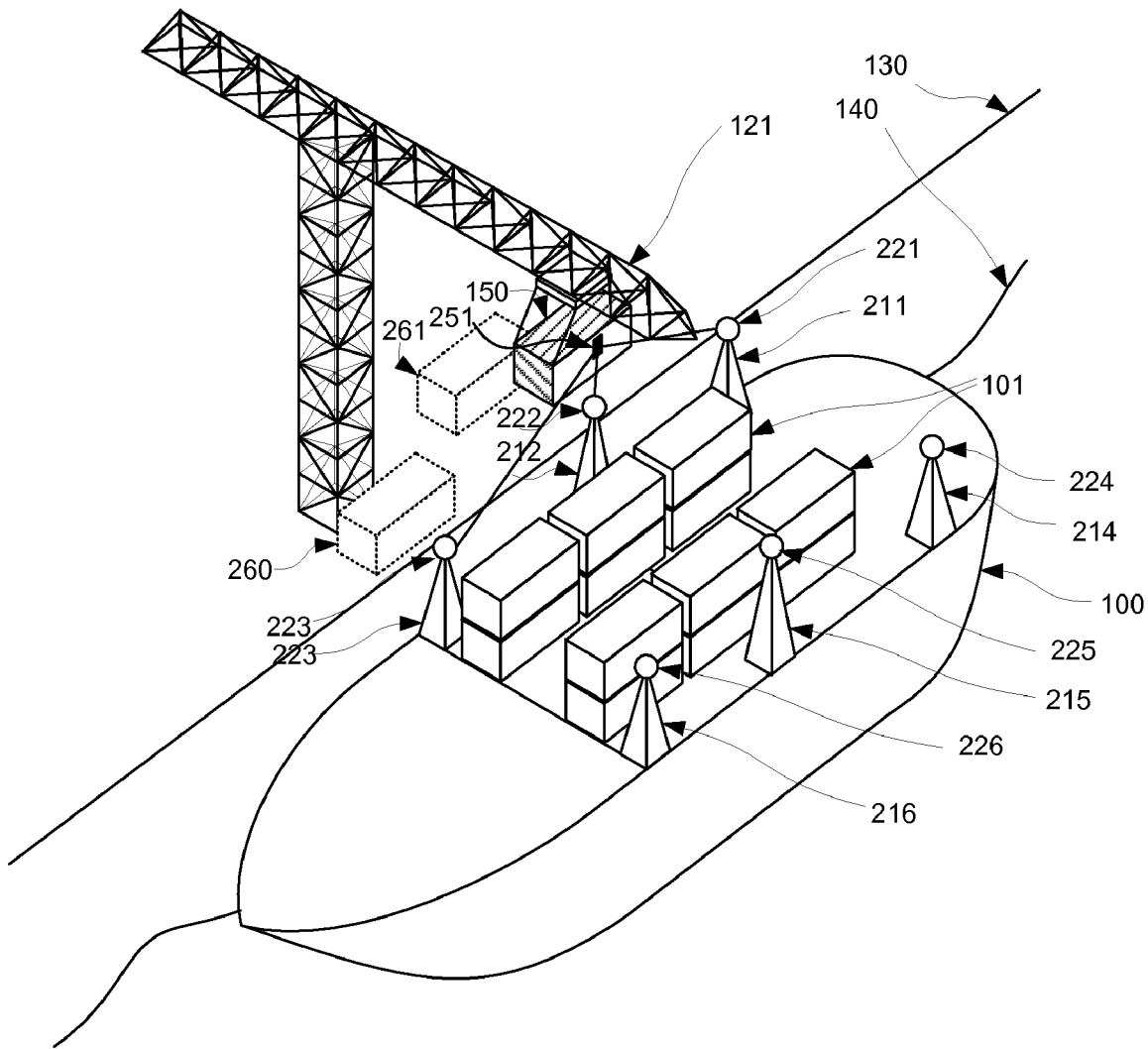
FIG. 2c shows a third stage of the first embodiment of the invention.

FIG. 2c shows a third stage of the first embodiment of the invention. As shown here the container 150 has been further lifted by the crane 121 and moved further towards the vessel 100. The shape of a container drawn with a broken line 261 shows the position of the container 150 of FIG. 2b. The new position of the container 150 is determined in communication with the location devices and recorded.

Figure 2D:
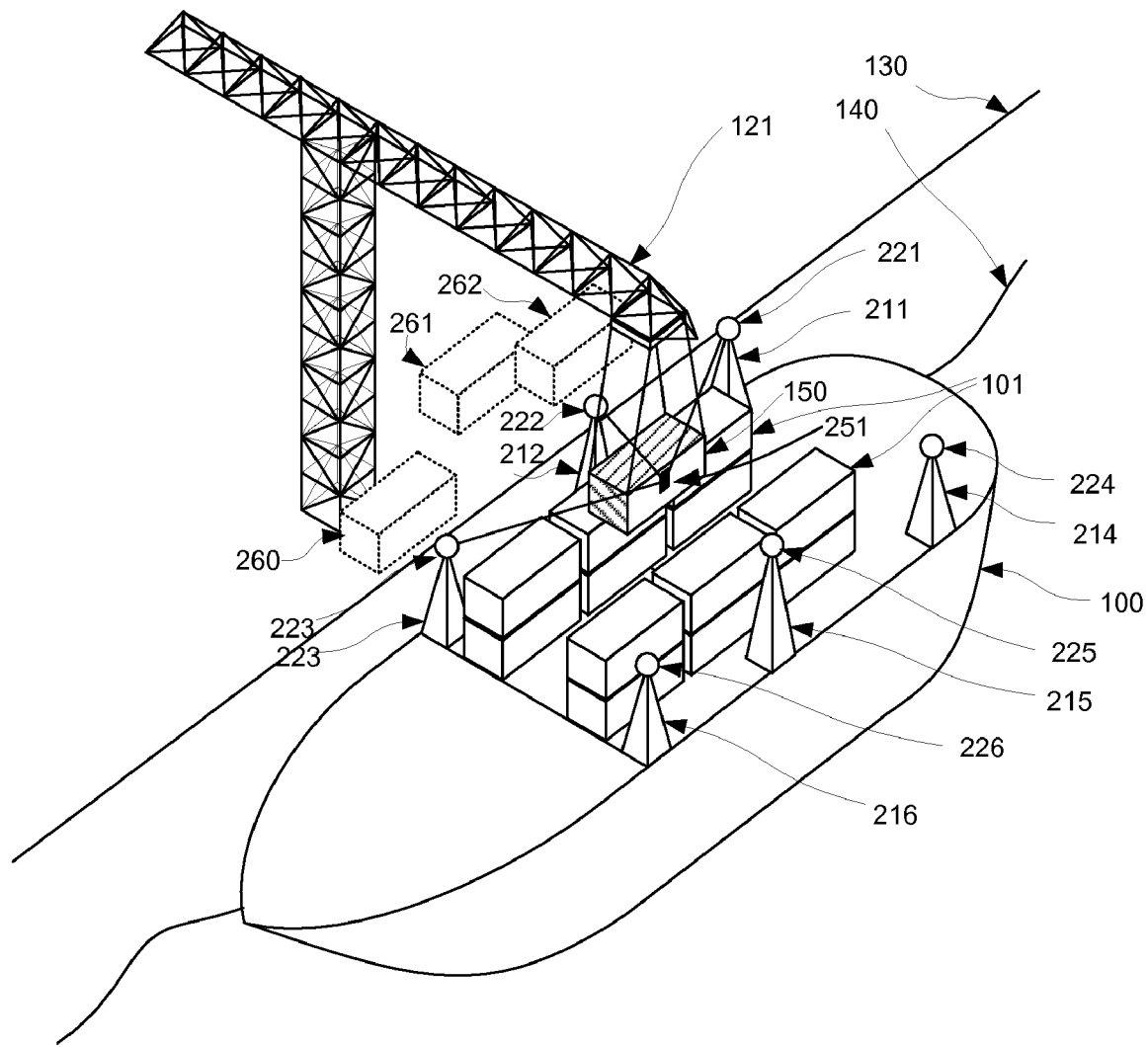
FIG. 2d shows a fourth stage of the first embodiment of the invention.

FIG. 2d shows a fourth stage of the first embodiment of the invention. As shown here the crane 121 has started to lower the container 150 and has moved further towards the center of the vessel 100. The shape of a container drawn with a broken line 262 shows the position of the container 150 of FIG. 2c. The new position of the container 150 is determined in communication with the location devices and recorded.

Figure 2E:
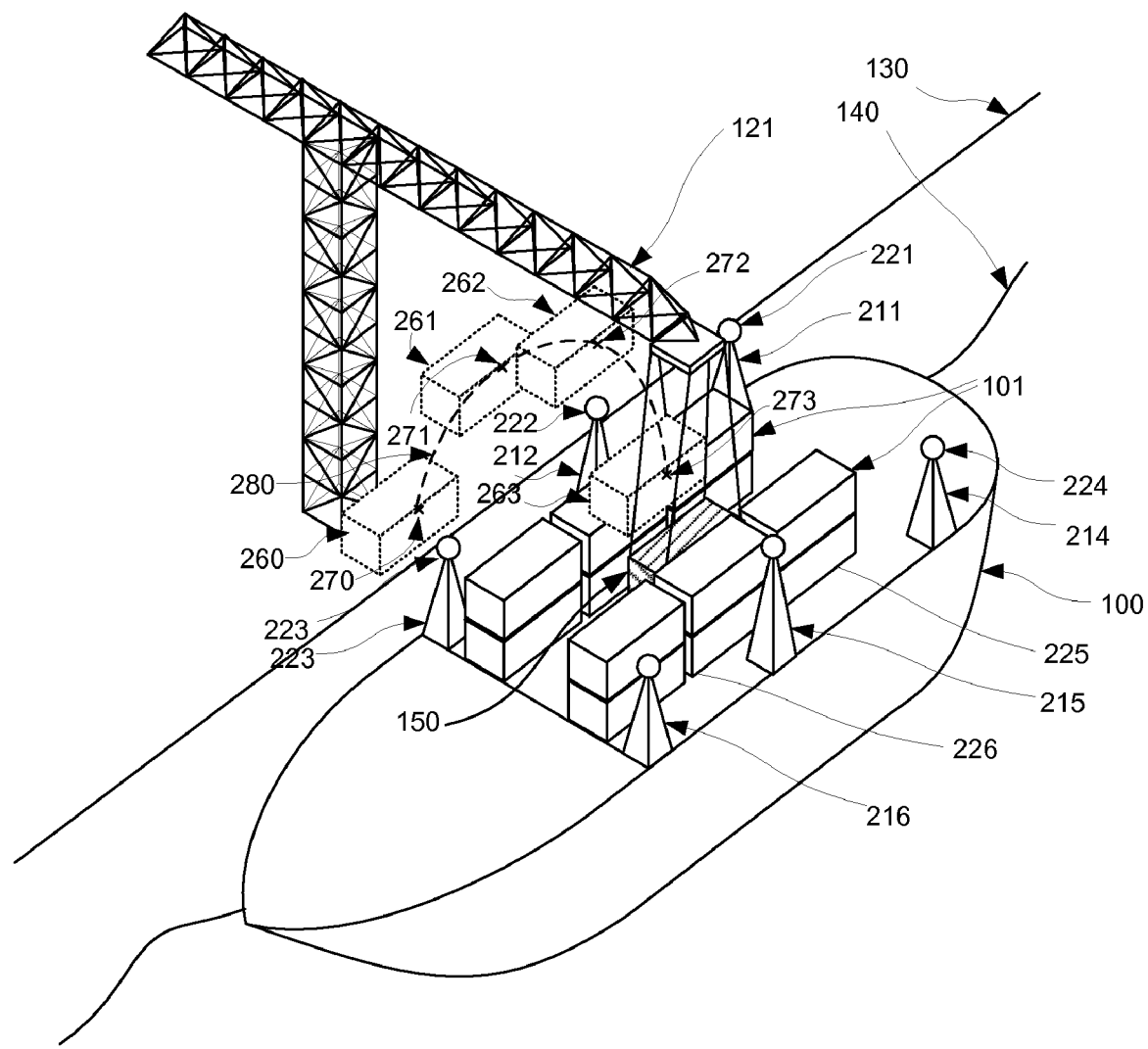
FIG. 2e shows a fifth and final stage of the first embodiment of the invention.

FIG. 2e shows a fifth and final stage of the first embodiment of the invention. As shown here the crane 121 lowered the container 150 to its final position at the center of the deck of the vessel 100 between the two rows of other containers 101. The shape of a container drawn with a broken line 263 shows the position of the container 150 of FIG. 2c. The new position of the container 150 cannot be directly determined in communication with the location devices, since it is now invisible to the location devices. However, a series of points 270, 271, 272, 273 defining the previous positions of the transducer 251 has been recorded. A trajectory as shown by the broken line 280 can be derived on the basis of this series of points. This trajectory, or the series of point which define it, can be compared to a trajectory envelope, and in a case where each of the positions are determined to lie within the trajectory envelope, it is admissible to consider the article to be present on the deck of the vessel, even though its presence there has not been positively detected.

While the example of FIG. 2 relates to the movement of an article onto a vessel, i.e., a loading operation, corresponding steps can easily be envisaged for an unload operation, or indeed any movement of an article, whether or not a vessel is involved.

Figure 3:
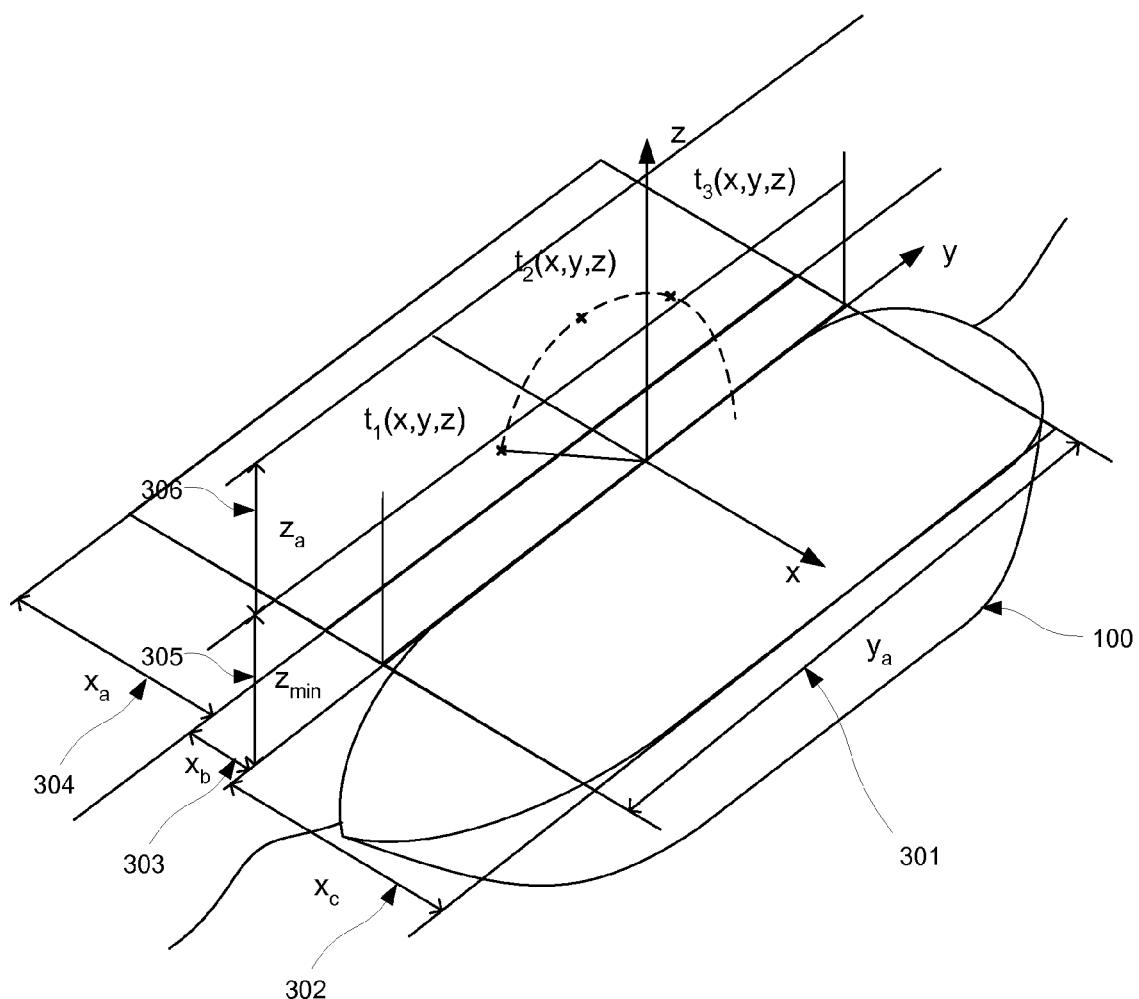
FIG. 3 shows an example of a set of thresholds forming a trajectory envelope.

According to certain embodiments the trajectory envelope may be defined in terms of a set of thresholds, which may be defined in terms of two or three dimensions. FIG. 3 shows and example of a set of thresholds forming a trajectory envelope. As shown, a set of values are defined which may then be combined doe define thresholds. Specifically, There is defined a value Xa as represented by the dimension line 304 corresponding to the distance from the inland edge of a loading zone to the quay side, a value Xb as represented by the dimension line 303 corresponding to the distance from the quay side to the side of the ship closest to the quay, a value Xc, as represented by the dimension line 302 corresponding to the distance abeam the vessel, a value Ya as represented by the dimension line 301 corresponding to the length of the cargo area of the vessels deck, a value Z min as represented by the dimension line 305 corresponding to the minimum height to which container should be lifted for transfer aboard the vessel, and a value Za as represented by the dimension line 306 corresponding to the height range the container should enter during a loading/unloading operation. The X, Y and Z prefixes correspond to the X, Y and Z coordinates established by the Cartesian axes shown in FIG. 3. The series of points 270, 271, 272, 273 as described with respect to FIG. 2 can be represented on the basis of this frame of reference as $t_1(x, y, z)$, $t_2(x, y, z)$, $t_3(x, y, z)$ and $t_4(x, y, z)$ respectively, where t represents the time value at which the measurement was made.

On the basis of such a set of thresholds, an algorithm may be envisaged for following the movement of the transducer through space, and determining whether its movements are in compliance with the trajectory envelope.

Figure 4:
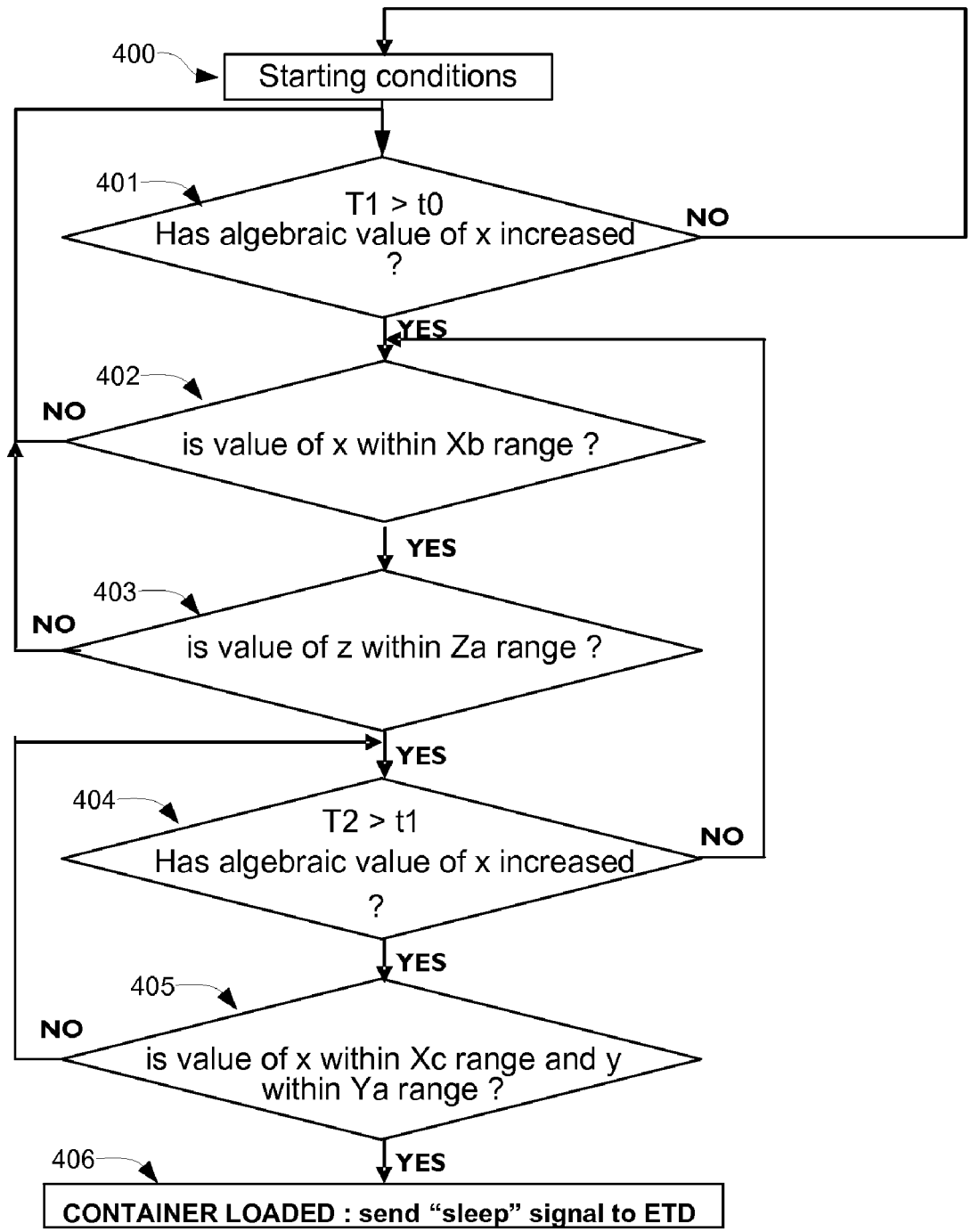
FIG. 4 shows an algorithm for determining whether an article's movements comply with a trajectory envelope as defined with reference to FIG. 3.

FIG. 4 shows an algorithm for determining whether an article's movements comply with a trajectory envelope as defined with reference to FIG. 3. As shown is FIG. 3, the position of the transducer is monitored. The example given on FIG. 4 illustrates a "Loading" operation. Step 400 is the initial situation at time T0, at which staring conditions for implementation of the method are assembled. The transducer is detected, through its ID, it is located in the loading area (x value within Xa as described with respect to FIG. 3. In that situation, a variation of x, or y or z on the position of the transducer is detected, and the step 401 is entered. At step 401 it is determined whether the algebraic x value of the most recent measurement has increased, this means the article exhibits a movement, that is, towards the vessel. If no such movement is detected, step 401 is repeated. If a movement towards the vessel is detected, it is determined at step 402 whether the new x position of the transducer is in the range Xb as described with respect to FIG. 3, that is, whether the transducer is over the gap between the quay and the vessel, or not. If the transducer is determined to be within the Xb range, the algorithm proceeds to step 403. Otherwise the algorithm returns to the step 401. At step 403 it is determined whether the new z position of the transducer is in the range Za as described with respect to FIG. 3, that is, whether the transducer has been raised sufficiently to be moved to the cargo deck, or not. If the transducer is determined to be within the Za range, the algorithm proceeds to step 404. Otherwise the algorithm returns to the step 401. At step 404 the algorithm determines whether a successive position sample exhibits an increase in the x value, that is, that the transducer is still moving seaward. If an increase in x value is detected, the algorithm proceeds to step 405. Otherwise, the algorithm returns to step 402. At step 405 it is determined whether the current x value is within the range Xc, and the current y value is within the range Ya, that is, whether the transducer is positioned over the cargo area of the vessel, or not. Where it is found that the current x value is within the range Xc, and the current y value is within the range Ya, the algorithm considers that the article associated with the transducer has been loaded onto the vessel. Otherwise the algorithm returns to step 405.

After step 405, where it is found that the current x value is within the range Xc, and the current y value is within the range Ya, the algorithm may proceeds to a further processing step. Otherwise, the algorithm loops on step 405 as described above. At this further processing step the algorithm might determines whether a successive position sample exhibits x value within the range Xc, and the current y value within the range Ya, and the algebraic z value of the most recent measurement has decreased, if all these conditions are met, only then considering that the article associated with the transducer has been loaded onto the vessel. Many such refinements to the algorithm enabling a more reliable and robust detection of the load state of the article may be envisaged.

Figure 5:
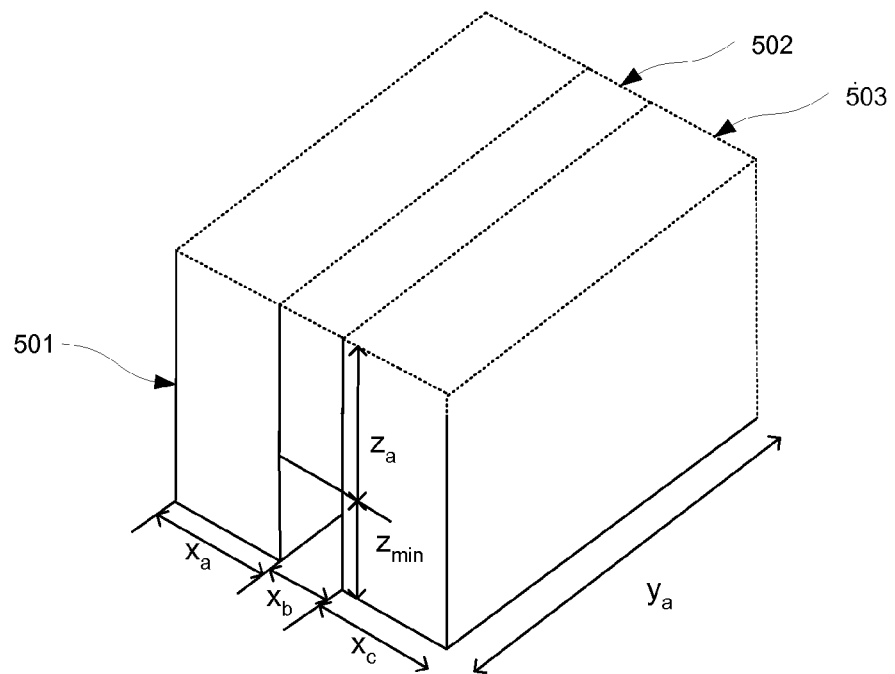
FIG. 5 shows a set of three volumes corresponding to the thresholds defined in FIG. 3.

FIG. 5 shows a set of three volumes corresponding to the thresholds defined in FIG. 3. The trajectory envelope may be defined in terms of a set of volumes Naturally the trajectory envelope may be defined with varying amounts of detail, and the steps of the algorithm correspondingly more or less sophisticated. The exact shape of the trajectory envelope may be defined taking into account the geometry of all of the elements involved. Certain such geometrical values may be automatically detected or manually entered on a case by case basis so that the trajectory envelope is dynamically determined for each new loading operating of one or more articles. Furthermore it should be appreciated that the trajectory envelope may be considered as a four dimensional envelope, or as a family of three dimensional envelopes with each envelope corresponding to a particular timing range.

Figure 6:
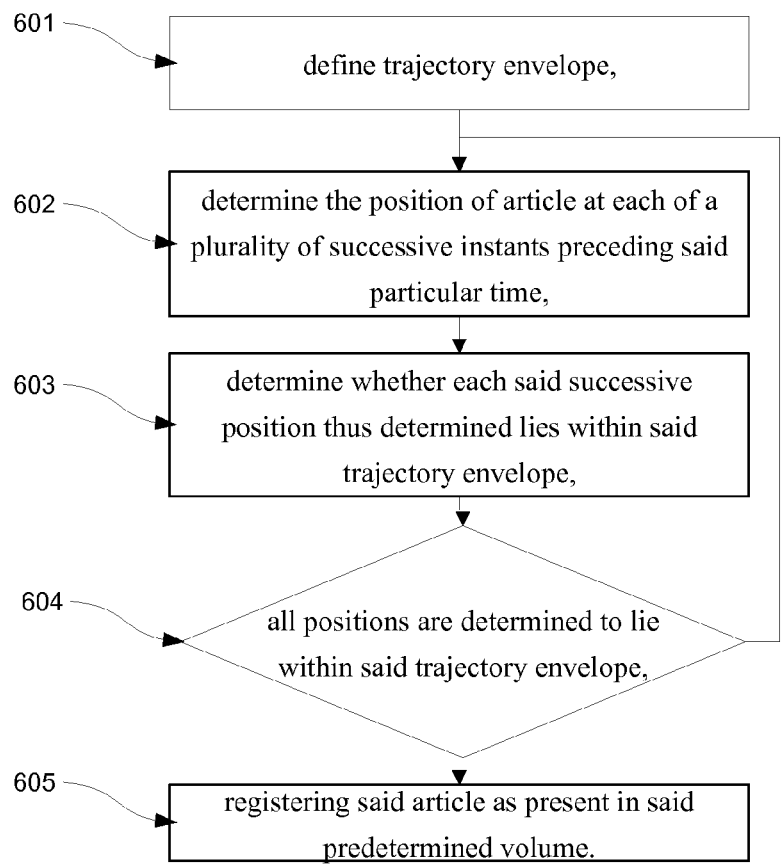
FIG. 6 is flow chart of the steps of certain embodiments.

FIG. 6 is flow chart of the steps of certain embodiments. As shown in FIG. 6 the method starts with a first step of defining a trajectory envelope at step 601. The method proceeds to step 602 at which the position of the article is determined at each of a plurality of successive instants. At step 603 it is determined whether each the successive position thus determined lies within the trajectory envelope, and at step 604, it is determined whether all of the positions lie within the trajectory envelope at step 605, and in a case where all of the positions are determined to lie within the trajectory envelope, the article registered as present in the predetermined volume at step 606. As shown in a case where not all of the positions are determined to lie within the trajectory envelope, the method returns to step 602.

The method may of course treat different position values or parts of a trajectory envelope differently. For example, if a particular reading falls outside the trajectory envelope, but the rest of the readings fall within the envelope, the aberrant reading may be disregarded altogether, or may be averaged together with other readings. An algorithm for deciding whether a particular reading may be disregarded or modified may be envisaged taking into account the relative significance of different parts of the trajectory envelope. For example, it may be that the movement of the article near the ground are subject to large and unpredictable movement due to the placement of other articles, traffic, bystanders and so on, while one up in the air the article tends to follow strictly its predetermined pattern. On this basis early readings, or readings near the ground might be treated as of little importance, so that the system could record several values outside the envelope but still consider that there were sufficient readings inside the envelope to consider the article to be present in the volume.

Still further, the system may be defining a trajectory envelope, reading weighting values and so on by means of a learning process, whereby readings gathered for articles that are confirmed to have been placed on the vessel are analyzed.

In an alternate embodiment, in order to make a still better determination of whether a particular operation has taken place, in addition to determining whether the article moves within the predefined trajectory envelope as described above, the hook or cradle used with the crane to pick and move the article, may itself be equipped with a further transducer along the lines of any described heretofore and having its own identity, identifying the crane. By monitoring this further transducer together with the first transducer associated with the article, the system could see that at in the loading operation described above, the cradle and article transducers have moved together following the same trajectory within the predefined envelope, and that after the loading operation completion has been determined by the system, only the cradle transducer is coming backward from the vessel. This would confirm with certainty a load operation and conversely for a unload operation.

Figure 7:
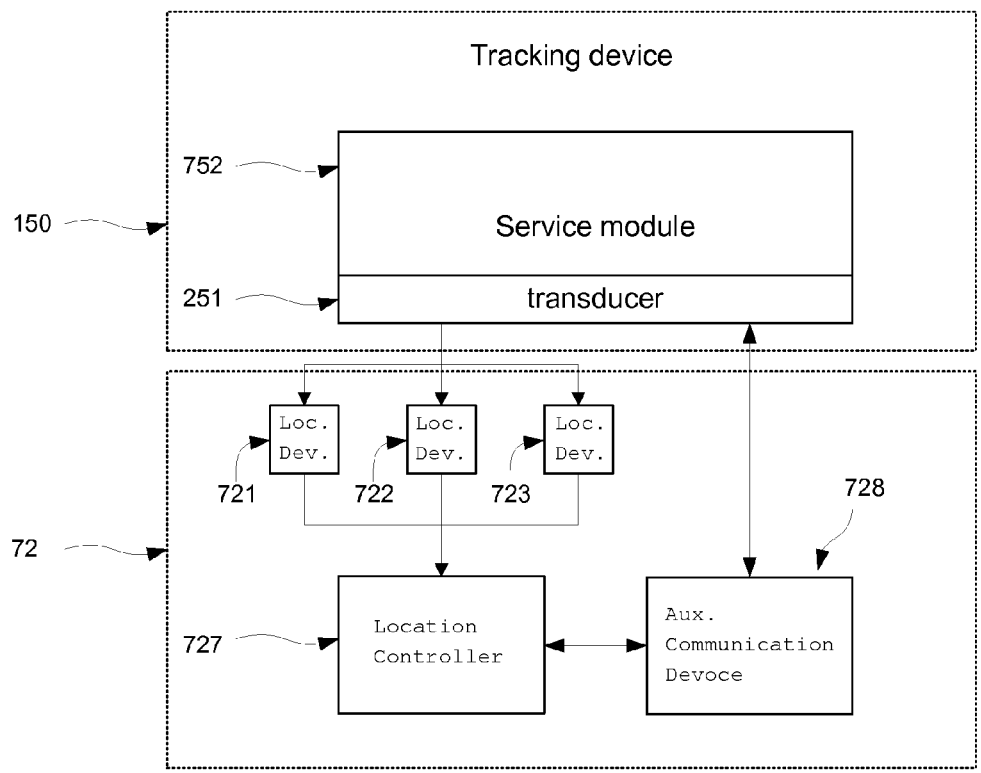
FIG. 7 is a block diagram of the components of the first embodiment.

FIG. 7 is a block diagram of the components of the first embodiment. As shown in FIG. 7 there is provided an article 150 associated with a tracking device 251 as described above, and a service module 752. Location system elements are grouped together in the box 72, which may represent for example the vessel, although there is no requirement for all the elements to be grouped together physically in this manner. As shown, the box 72 contains three location devices 721, 722, 723, which correspond to the three location devices 221, 222 and 223 as described above. there is further provided a location controller 727. The location devices 721, 722, 723 are in communication with the location module 251 as described above. The location devices 721, 722, 723 are furthermore in communication with the location controller 727, which gathers data from the location devices, and may carry out any or all of the steps 601 to 605 described above.

There is additionally provided an auxiliary communication device 728 which offers an additional duplex communication channel, for example by means of a radio channel. This channel may be used in particular during the loading and unloading operations, allowing exchange of information between the transducer and the location controller. This may enable for example informing the tracking device that it is in loading or unloading operation.

The service module may provide power to the tracking module, and may itself have tracking or other functionality. The transducer is in communication with the service module, and may act so as to trigger a change of state therein, for example provoking a switch between an active state and a sleep mode. In particular, the arrival of the article in the predetermined volume as detected at step 605 of FIG. 6 may be interpreted as indicating a loading operation, i.e. of the article onto the vessel. The detection of such an operation may be the required trigger for such a change of state.

In particular, the service module may incorporate tracking means such a GPS receiver and possibly processor, communication means such as a radio transmitter etc, for use in an article tracking system, which gathers location information on the basis of data from such devices. By putting such systems in a sleep mode in which high power consumption activities such as high power transmission of data or complex processing operations are halted, it is possible to substantially extend the duration of the service module's power reserves.

On this basis, the following process may be envisaged:

1—When the Container is loaded into the Vessel, i.e. taken from the Quay and moved to its target location in the Vessel, this loading situation is recognized by the system, on the basis of the compliance of the articles movements with the trajectory envelope as described above.

The "Load/Unload operation" Information is sent by the location controller 727 to the transducer 251 via the communication device 728.

2—The transducer 251 can send an acknowledgement to the location controller and instruct the service module 752 to switch to a sleep/active mode.

3—The location controller may send to a backend system the list of containers loaded/unloaded (including Location Id, Vessel or Cargo Id, timestamp, . . . etc)

4—During a later unloading phase, location controller sends the "unloading operation" information to the transducer 251.

5—The transducer 251 can send an acknowledgement to the vessel system and indicate to the service module 752 to switch to active mode.

6—The Location Controller is able to send to a backend system the list of containers unloaded (including Location Id, Vessel or Cargo Id, timestamp, . . . etc)

Figure 8:
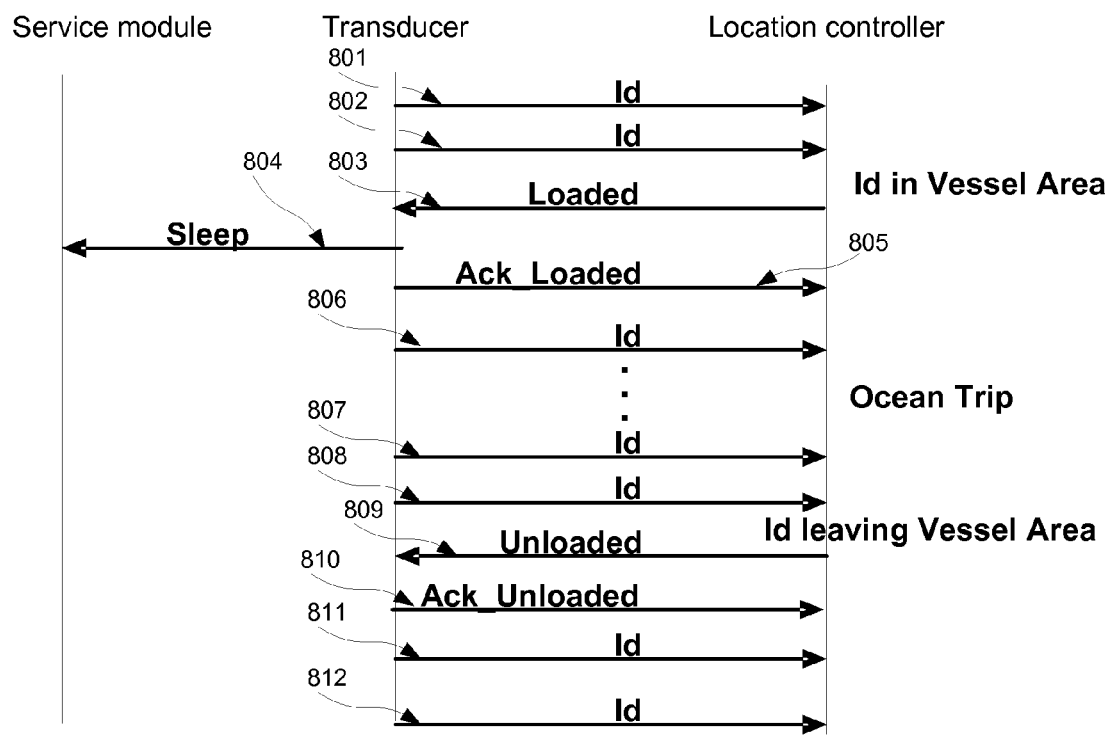
FIG. 8 shows a sequence of communications between the service module, transducer and location controller in implementing certain embodiments.

FIG. 8 shows a sequence of communications between the service module, transducer and location controller in implementing certain embodiments. As shown, the transducer first periodically emits identity data in transmissions 801 and 802. These transmissions are received at different timings by the location devices 721, 722, 723 as described above, and on the basis of these timing differences the location controller 727 is able to determine the location of the transducer from each transmission. If each of the points complies with the trajectory envelope as described above, the location controller emits a load notification message 803, to inform the transducer that it has been registered as having been moved to the predetermined volume. In response to this notification the transducer issues a sleep instruction 804 to the service module. The transducer also acknowledges the notification 803 in an acknowledgement message 805. The transducer continues to periodically emit its identity signal in message 807. The identity signal is emitted sufficiently often to allow the plotting of a trajectory during a movement operation such as loading or unloading, i.e. in the order of a few seconds. Lower frequencies may make it difficult to plot a representative trajectory, and higher frequencies may lead to an undue drain in the transducer's power supply. The period between movement operations may be very long, in the order of months or years. As such, the number of id signals emitted will be very large. When the transceiver comes into the view of active location devices once more, these will receive and process the signals once more. Thus when the transducer emits identity data in transmissions 807 and 806 in the vicinity of location devices 721, 722, 723. These transmissions are received at different as described above, and on the basis of these timing differences the location controller 727 is able to determine the location of the transducer from each transmission. If each of the points complies with the relevant trajectory envelope, which may be different to that used for the load operation, the location controller emits an unload notification message 809, to inform the transducer that it has been registered as having been left the predetermined volume, or as having entered a new predetermined volume. The transducer acknowledges the notification 809 in an acknowledgement message 810, and continues to emit ID signals 811, 812.

Figure 9:
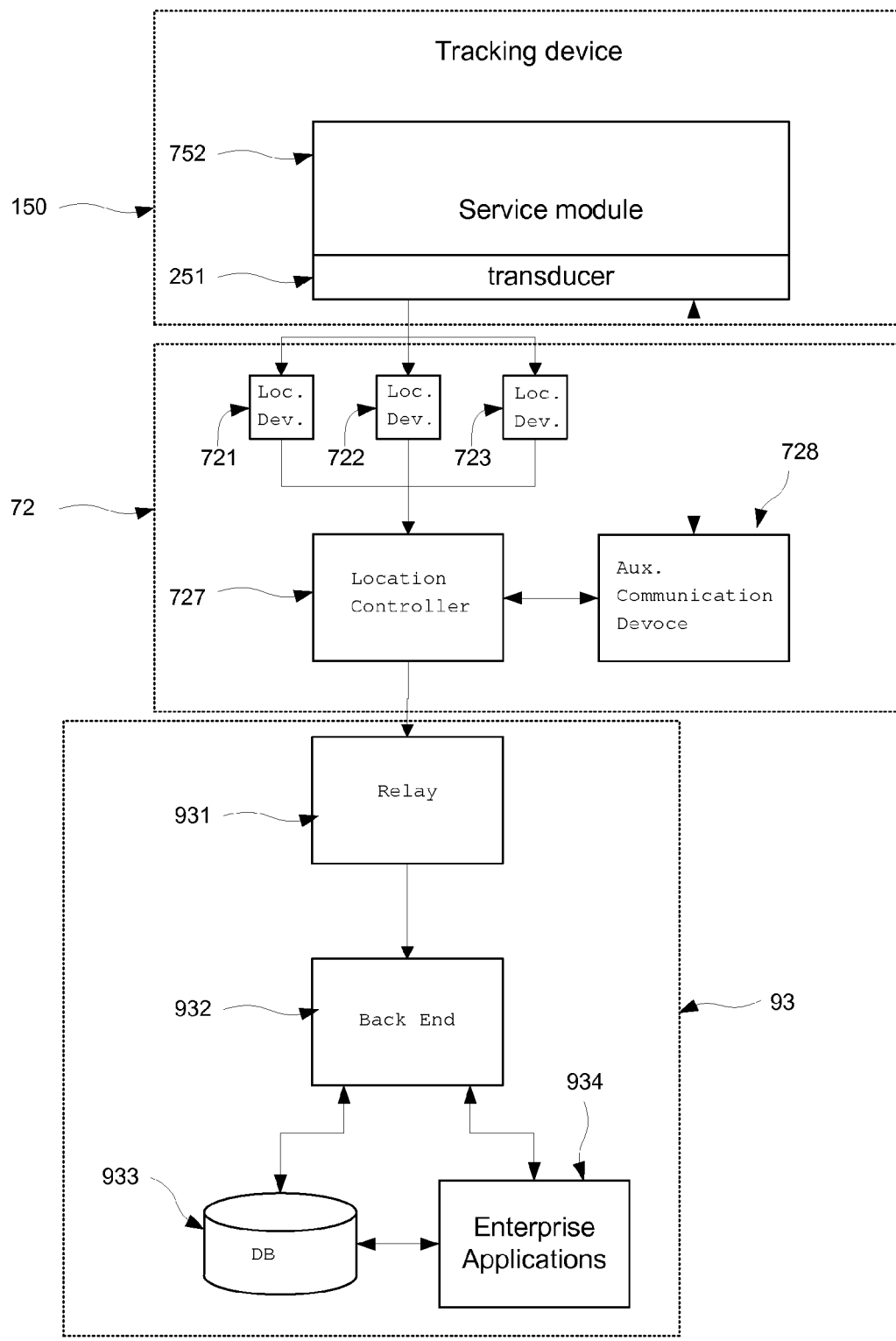
FIG. 9 shows the location system of FIG. 7 associated with a backend tracking system.

FIG. 9 shows the location system of FIG. 7 associated with a backend tracking system 930. As shown in FIG. 9 there is provided a data relay 931, which may be a cellular telephone or data network such as GSM/GPRS, satellite relay, etc. There is further provided a Back End 932, in communication with enterprise applications 934 and a tracking database 933.

The Backend 932, is the intermediary between the Transducer and support module and Enterprise applications such as route planning, order management, or booking systems. As such, the Backend may play a number of important roles. It may be used to configure the transducer or service module with business rules and geographic information for a particular trip. It may communicate with the transducer and receive events and alerts. It filters, correlates, and aggregates the received data and forwards this data to interested parties. It can provide automated decision making. It notifies trading partners about incidents or delays, and display collected data to authorized users.

enterprise applications 934 may include services for real-time and near-time tracking and monitoring of container shipments. Real-world information is captured using the Transducer and support module, then filtered, aggregated, and provided to backend systems and databases such as tracking database 933. Business rules such as allowed temperature ranges or expected whereabouts (defined as 'geo-zones') can be defined for a particular shipment. Container Tracking Services monitor and correlate the incoming Tracking device data, and then forward events of interest to external systems and user groups.

According to certain embodiments, there are provided the steps of detecting whether an article has been loaded or unloaded for example from a ship by tracking the movements of a transducer such as an RFID tag attached to the article in space, and comparing the tracked movements with a trajectory envelope characterizing the movements associated with a load or unload action, and in the case where the movements of the article are found to comply with the trajectory envelope, registering the article as present in the predetermined volume.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. In particular, the invention may be realized by software or firmware implementing the location controller as described above.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of determining whether an article is present in a predetermined three-dimensional volume at a particular time, comprising:
    defining a three-dimensional trajectory envelope, wherein the three-dimensional trajectory envelope is defined by X, Y, and Z coordinates, and wherein the X, Y, and Z coordinates defining the three-dimensional trajectory envelope comprise a width, length, and height, respectively, of the three-dimensional trajectory envelope;
    determining a position of a first transducer associated with the article, at each of a plurality of successive instants preceding the particular time, the position of the first transducer comprising X, Y, and Z coordinates of the first transducer associated with the article;
    determining a position of a second transducer associated with a coupler of a crane as the crane displaces the article between first and second locations, at each of a plurality of successive instants preceding the particular time, the coupler attaching the article to the crane, the position of the second transducer comprising X, Y, and Z coordinates of the second transducer;
    determining, using a computer device, whether the X, Y, and Z coordinates of each successive position of the first transducer associated with the article, and of each successive position of the second transducer associated with the coupler of the crane, lie within the X, Y, and Z coordinates defining the three-dimensional trajectory envelope as the article is displaced by the crane between the first and second positions; and
    in a case where all of the positions of the first and second transducers are determined to lie within the X, Y, and Z coordinates defining the three-dimensional trajectory envelope, registering the article as present in the predetermined three-dimensional volume.

2. The method of claim 1, wherein the position of the article is determined at each of the plurality of successive instants by measuring differences between respective transit times of signals between location devices at each of a plurality of physically separated points at known locations and the first transducer.

3. The method of claim 2, wherein the signals are transmitted from the article and received at the points.

4. The method of claim 2, wherein the signals are transmitted from the points and received at the first transducer.

5. The method of claim 2, wherein the points are at known positions relative to the predetermined volume.

6. The method of claim 1, wherein the article is a shipping container.

7. The method of claim 1, wherein the volume is a cargo area of a vehicle.

8. The method of claim 1, wherein the trajectory is non-ballistic.

9. The method of claim 1, wherein the trajectory envelope is defined as a function of a geometry characterizing the environment.

10. The method of claim 1, wherein the trajectory envelope corresponds to movements consistent with a deliberate mechanical movement of the first transducer from a starting position to the predetermined volume.

11. The method of claim 1, wherein the volume lies outside the trajectory envelope.

12. The method of claim 1, further comprising:
    issuing a notification to the first transducer when the article is registered as present in the predetermined volume.

13. The method of claim 12, further comprising:
    putting hardware associated with the first transducer into a sleep mode in response to the notification.

14. A computer program stored on a computer readable medium, which when executed, determines whether an article is present in a predetermined three-dimensional volume at a particular time, comprising program code for:
    defining a three-dimensional trajectory envelope, wherein the three-dimensional trajectory envelope is defined by X, Y, and Z coordinates, and wherein the X, Y, and Z coordinates defining the three-dimensional trajectory envelope comprise a width, length, and height, respectively, of the three-dimensional trajectory envelope;
    determining a position of a first transducer associated with the article, at each of a plurality of successive instants preceding the particular time, the position of the first transducer comprising X, Y, and Z coordinates of the first transducer associated with the article;
    determining a position of a second transducer associated with a coupler of a crane as the crane displaces the article between first and second locations, at each of a plurality of successive instants preceding the particular time, the coupler attaching the article to the crane, the position of the second transducer comprising X, Y, and Z coordinates of the second transducer;
    determining whether the X, Y, and Z coordinates of each successive position of the first transducer associated with the article, and of each successive position of the second transducer associated with the coupler of the crane, lie within the X, Y, and Z coordinates defining the three-dimensional trajectory envelope as the article is displaced by the crane between the first and second positions; and
    in a case where all of the positions of the first and second transducers are determined to lie within the X, Y, and Z coordinates defining the three-dimensional trajectory envelope, registering the article as present in the predetermined volume.

15. A system for performing a method for determining whether an article is present in a predetermined three-dimensional volume at a particular time, the method comprising:
    defining a three-dimensional trajectory envelope, wherein the three-dimensional trajectory envelope is defined by X, Y, and Z coordinates, and wherein the X, Y, and Z coordinates defining the three-dimensional trajectory envelope comprise a width, length, and height, respectively, of the three-dimensional trajectory envelope;
    determining a position of a first transducer associated with the article, at each of a plurality of successive instants preceding the particular time, the position of the first transducer comprising X, Y, and Z coordinates of the first transducer associated with the article;
    determining a position of a second transducer associated with a coupler of a crane as the crane displaces the article between first and second locations, at each of a plurality of successive instants preceding the particular time, the coupler attaching the article to the crane, the position of the second transducer comprising X, Y, and Z coordinates of the second transducer;

determining whether the X, Y, and Z coordinates of each successive position of the first transducer associated with the article, and of each successive position of the second transducer associated with the coupler of the crane, lie within the X, Y, and Z coordinates defining the three-dimensional trajectory envelope as the article is displaced by the crane between the first and second positions; and registering the article as present in the predetermined volume, in a case where all of the positions of the first and second transducers are determined to lie within the X, Y, and Z coordinates defining the three-dimensional trajectory envelope.

16. The computer program of claim 14, wherein the trajectory envelope is defined as a function of a geometry characterizing the environment.

17. The computer program of claim 14, wherein the trajectory envelope corresponds to movements consistent with a deliberate mechanical movement of the first transducer from a starting position to the predetermined volume.

18. The system program of claim 15, wherein the trajectory envelope is defined as a function of a geometry characterizing the environment.

19. The system of claim 15, wherein the trajectory envelope corresponds to movements consistent with a deliberate mechanical movement of the first transducer from a starting position to the predetermined volume.

* * * * *